Dec. 12, 1933.　　　　　E. E. ERVIN　　　　　1,939,258
TRACTOR ATTACHMENT
Filed June 26, 1931　　　2 Sheets-Sheet 1
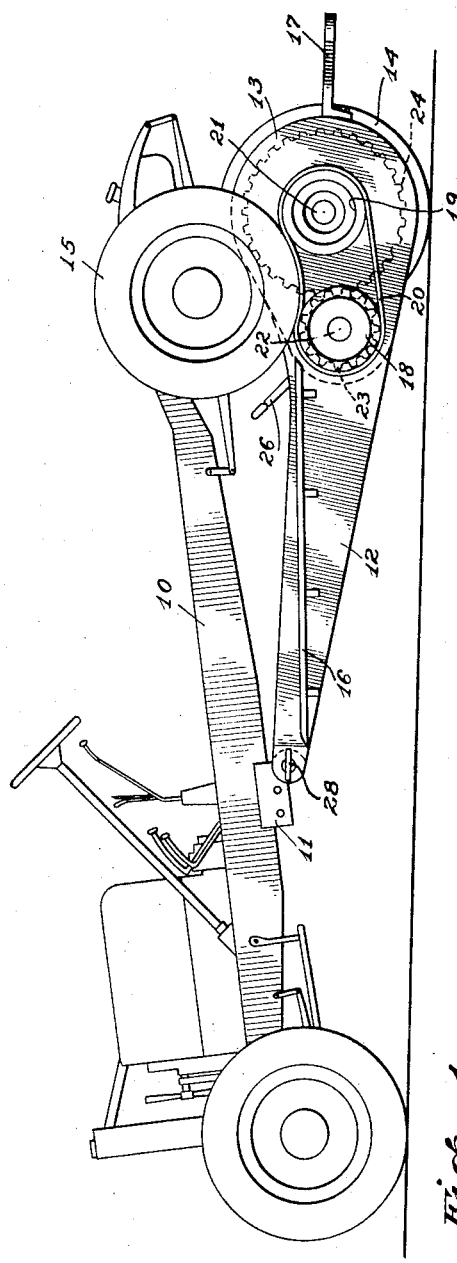
Fig. 1.
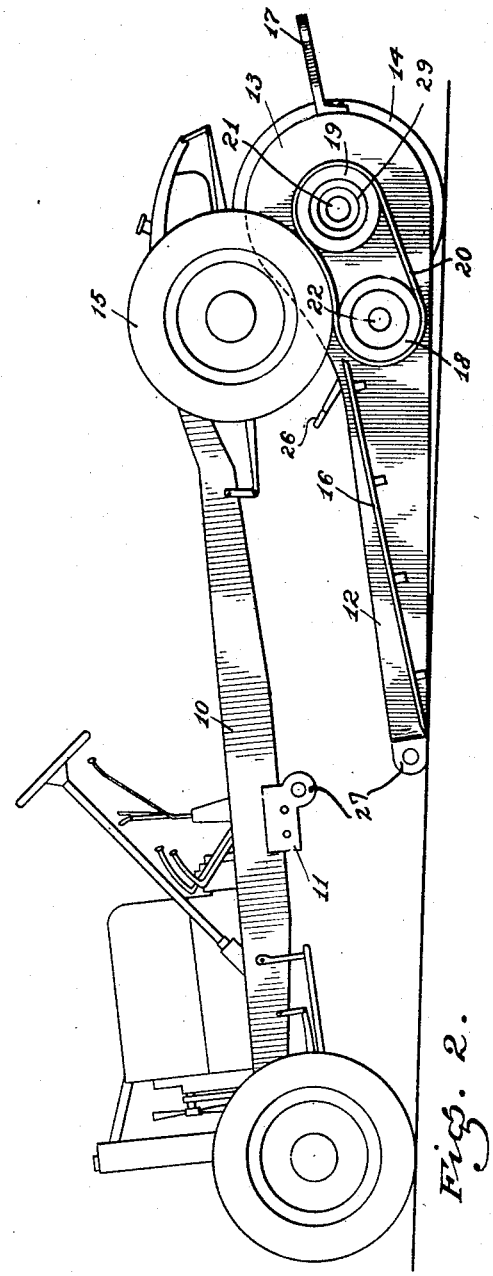
Fig. 2.
INVENTOR.
ERNEST E. ERVIN.
BY 
ATTORNEYS.

Dec. 12, 1933.  E. E. ERVIN  1,939,258
TRACTOR ATTACHMENT
Filed June 26, 1931  2 Sheets-Sheet 2
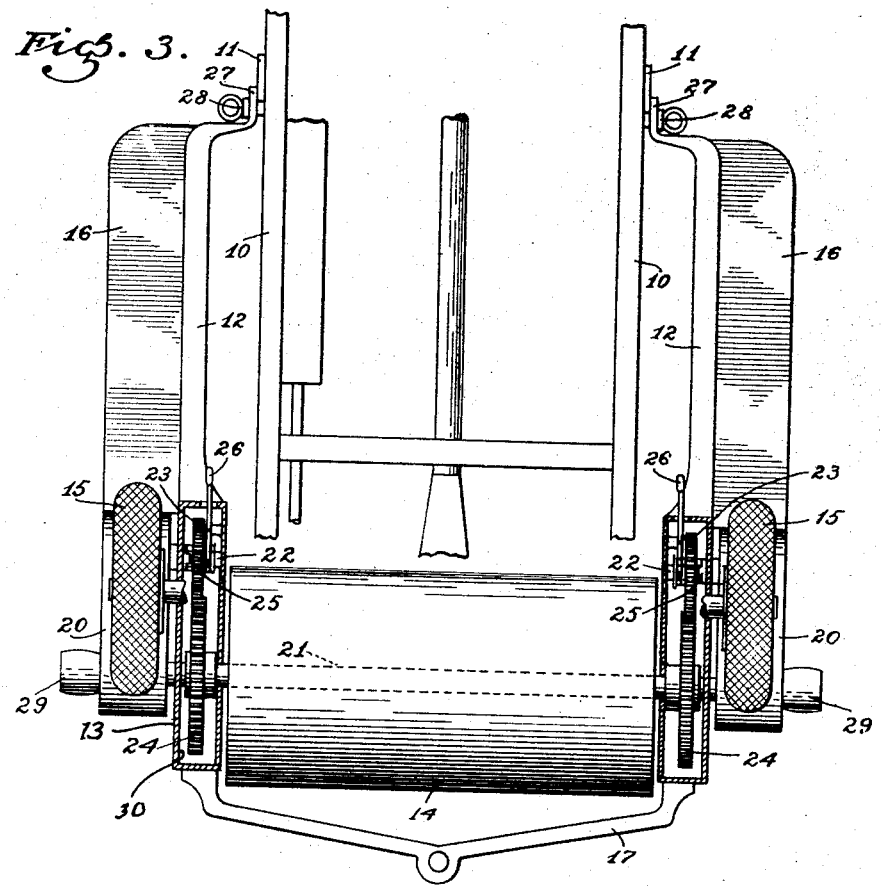
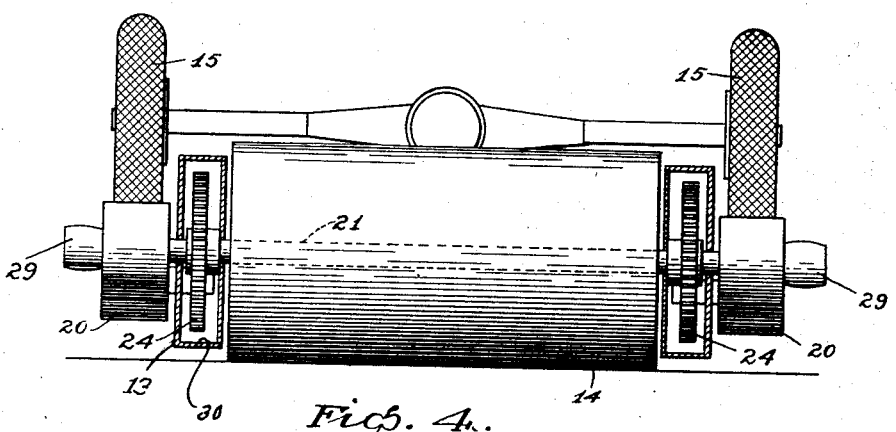
INVENTOR.
ERNEST E. ERVIN.
BY
ATTORNEYS.

Patented Dec. 12, 1933

1,939,258

UNITED STATES PATENT OFFICE 1,939,258

TRACTOR ATTACHMENT

Ernest E. Ervin, Seigler Springs, Calif., assignor to William A. Forbes, San Francisco, Calif.

Application June 26, 1931. Serial No. 547,077

7 Claims. (Cl. 180—16)

My present invention relates to a tractor attachment for pleasure automobiles and trucks and more particularly to an attachment which can be connected in a simple and convenient manner to an automobile without necessitating any modification in the automobile structure.

An object of my invention is to provide a new and novel type of tractor attachment for automobiles which is practical, simple and efficient in operation.

A further object of my invention is to provide a tractor attachment for automobiles which has suitable means whereby the automobile may be placed thereupon in a simple and convenient manner.

Another object of my invention is to provide a tractor attachment for automobiles having a novel means for transmitting power from the rear wheel of the automobile to the tractor driving element.

A further object of my invention is to provide a tractor attachment for automobiles which, when stationary, can be adapted to the driving of auxiliary power driven apparatus.

Another object of my invention of is to provide a tractor attachment having an auxiliary driving means for power driven apparatus which is adapted to be disconnected from the tractor element to permit the driving of auxiliary power driven apparatus when the tractor element is stationary.

In the art to which my invention pertains there have been provided many different types of attachments for rendering automobiles of the usual type suitable for heavy duty traction work. These attachments have taken various shapes and in practically all cases have in one way or another necessitated a modification of the automobile structure in order to render them operable therewith.

In carrying out my invention I propose to provide a simple type of traction element in the form of a relatively large cylinder that extends across the width of the automobile. This cylinder is mounted in a suitable frame upon which the rear end of the automobile may be easily backed, the frame being provided with a suitable tread for guiding the rear wheels of the automobile into driving relation with the traction element. The frame also carries a novel arrangement of an endless track and gears, by means of which a maximum of power may be transmitted from the automobile engine to the traction element.

For a better understanding of my invention, reference should be had to the accompanying drawings wherein I have shown by way of illustration and not of limitation a preferred embodiment thereof.

In these drawings wherein like figures refer to like parts throughout the several views;

Figure 1 is a side elevation of an automobile chassis with my improved attachment secured thereto, Figure 2 is a similar view showing my attachment in the position which it assumes when the automobile is being mounted thereupon, Figure 3 is a fragmentary plan view partially in section showing some of the details of my invention, and Figure 4 is a fragmentary rear view partially in section taken from Figure 3.

In the drawings 10 designates the frame of the automobile chassis upon which the usual automobile equipment and body are mounted. In order to simplify the illustrations the body of the automobile has been omitted in the drawings, but it is to be understood that my attachment is so constructed that it will not interfere with the running board or other portions of any standard automobile and it is therefore not necessary that the chassis be stripped, as shown in the illustrations.

Secured upon each side of the chassis 10, I show suitable couplings 11 that can be permanently attached to the chassis frame 10. These coupling members 11 are so positioned upon the frame 10 that they can be conveniently engaged by the ends of a pair of projecting arms 12 carried by a tractor element supporting frame 13. The frame 13 is provided with a suitable traction roller or other type of traction means 14 that is geared to a driving means which will be presently described.

When the tractor attachment is in its operative position it is adapted to support the rear wheels of the automobile in driving engagement with the aforesaid tractor driving means. In order that the rear wheels of the automobile, designated by the numeral 15, may be conveniently placed in driving engagement with the tractor driving means I provide upon the arms 12 a pair of outwardly extending treads 16 which, when the tractor attachment is in the position illustrated in Figure 2, serve to guide the rear end of the automobile to the tractor driving means in a convenient manner. Projecting rearwardly from the frame 13 and extending around the traction element 14, I also provide a suitable draw bar 17 to which any other apparatus or traction load may be attached.

In the preferred embodiment of my invention the driving means for the traction element 14 comprises freely movable spaced pulleys or guides 18 and 19 at each side of the traction element 14 over which an endless belt or tread 20 is disposed. The guides 18 and 19 are so spaced that when the wheels 15 are properly placed upon the treads 20 the latter will sag and engage a considerable portion of the treads of the tires upon the wheels 15. The guides or pulleys 19 are journaled so as to be always freely rotatable upon the extensions of the axle 21. The guides 18 are freely journaled upon counter shafts 22 and are adapted to engage with sliding gears 23 upon the shafts 22.

Affixed to the traction element 14 and meshing with the gears 23, I show a second gear 24 which serves to drive the traction element 14 when the gears 23 are connected with the guides 18 of the treadways 20. As illustrated in Figure 3 of the drawings, the gears 23 are provided with a splined surface 25 which is adapted to be moved into engagement with a similar splined surface carried by the guides or pulleys 18. A suitable shifting lever 26 is provided for effecting this movement of the gears 23.

As a simple means for securing my improved tractor attachment to an automobile frame I provide cooperating eyelets 27 upon the members 11 and the arms 12 through which a pin 28 may be passed.

When the arms 12 are connected to the automobile chassis as shown, and a tractive effort is exerted by the roller or traction element 14, the driving forces will be exerted directly upon the frame 10 at a point where it will be most effective.

Another advantageous feature in attaching the arms 12 at this point is that when the wheels 15 are in position upon the treads 20, as shown in Figure 2, the operator can raise the arms 12 into position by blocking the front wheels and applying power to the rear wheels 15.

As a means for driving auxilary apparatus from my improved tractor attachment when the latter is stationary I may provide an auxiliary pulley 29 upon the rear tread guide 19. When the device is operating in this manner it will be understood that one of the gears 23 will be disengaged from its corresponding treadway guide 18, so that when the automobile wheels are driven the treadway will rotate freely and transmit power to the auxiliary pulley 29 without imparting any movement to the traction element 14. During this operation it will be understood that the differential of the automobile drive will come into operation and turn the freed wheel and its treadway without imparting movement to the traction element. In extreme cases I may also block the traction element to prevent its movement should a heavy load be imposed by the auxiliary apparatus.

In the drawings the frame 13 is shown as having duplicate driving gears 23 and 24 and treadways 20, but it should be understood that a single treadway on either side of the frame will be sufficient where there is no objection to transmitting the power through the differential gears with one wheel stationary. This latter arrangement will produce higher speeds than when both rear wheels are operating and therefore where I provide a double drive I prefer to also provide a clutch lever 26 for each gear 23. Under these conditions each of the treadway guides 19 can be provided with detachable pulleys 29 so that power can be taken from both or either pulley.

In Figures 3 and 4 of the drawings the frame 13 is shown as exaggerated in width for the purpose of more clearly illustrating the details of the driving means. As here shown, the gears 23 and 24 are disposed in a dust proof gear housing 30 which is adapted to carry sufficient oil to continuously lubricate the gears and bearings.

Should it be desired to lengthen the traction roller 14 or provide a different type of traction means which would not permit of a disposition of the gear housing 30 inside the wheels 15 the housing can be located outside of the wheels by simply extending the shafts 21 and 22 outwardly beyond the wheels 15.

While I have, for the sake of clearness and in order to disclose my invention so that the same can be readily understood, described and illustrated specific devices and arrangements, I desire to have it understood that this invention is not limited to the specific means disclosed but may be embodied in other ways that will suggest themselves, in view of this broad disclosure, to persons skilled in the art. It is believed that this invention is broadly new and it is desired to claim it as such so that all such changes as come within the scope of the appended claims are to be considered as part of this invention.

Having thus described my invention, what I claim and desire to secure by Letters Patent is—

1. A tractor attachment for an automobile comprising, a U-shaped frame structure having its sides extending along and adapted to be pivotally attached to the frame of an automobile between its front and rear wheels, a traction element between the sides of said frame adapted to engage the ground, an endless treadway journaled to freely rotate upon said frame at each end of said traction element on which the rear wheels of the automobile may operate, and a geared driving connection between each of said treadways and said traction element.

2. A tractor attachment for an automobile comprising, a U-shaped frame structure having its sides extending along and adapted to be pivotally attached to the frame of an automobile between its front and rear wheels, a traction element journaled between the sides of said frame adapted to engage the ground, an endless treadway mounted upon said frame structure at each end of said traction element on which the rear wheels of the automobile may operate, an auxiliary power take-off pulley driven by the endless treadways at each end of the traction element, a geared driving connection between each of said treadways and said traction element, and clutch means whereby one or both of said geared driving connections can be disconnected to permit said treadways being used to drive said power take-off pulleys without driving said traction element.

3. A tractor attachment for an automobile comprising, a frame structure having forwardly extending arms adapted to be pivotally attached to the frame of an automobile, a traction element carried by said frame adapted to engage the ground, an endless treadway at each end of said traction element upon which the rear wheel of the automobile may operate to drive said traction element, and an outwardly extending runway upon said frame in line with said treadways, whereby the rear of the automobile may be backed into position upon the treadways under its own power.

4. In a tractor attachment for automobiles, the combination of a frame member adapted to be pivotally secured to the frame of an automobile between its front and rear wheels and support the rear end thereof, a traction element journaled upon said frame adapted to engage the ground, an endless belt treadway journaled upon said frame adapted to be driven by a rear wheel of the automobile, a power take-off pulley driven by said treadway, a geared driving connection between said treadway and said traction element, and clutch means for disconnecting said geared driving connection, whereby said treadway may be used independent of the traction element to drive said power take-off pulley.

5. A tractor attachment for automobiles comprising, a U-shaped frame member adapetd to be pivotally secured at its ends to the frame of an automobile between its front and rear wheels and support the rear wheels thereof, a traction roller journaled within said frame adapted to engage the ground, a freely movable endless belt treadway upon said frame adapted to be driven by a rear wheel of the automobile, a geared driving connection between said treadway and said roller, and means for connecting said treadway with the traction roller, whereby when said treadway is driven by the rear wheels of the automobile said traction roller will be driven.

6. In a tractor attachment for automobiles, the combination of a substantially U-shaped frame member having a traction roller journaled thereupon and disposed transversely between the sides thereof, means at the forward ends of said U-shaped frame member adapted to be pivotally attached to the chassis of the automobile between its front and rear wheels, endless trackways upon said frame member with which the rear wheels of the automobile engage, and a driving connection between said endless trackways and the traction roller adapted to transmit power to said traction roller when said automobile wheels are in motion.

7. In a tractor attachment for automobiles, the combination of a frame member having a pair of forwardly extending arms, means at the end of said arms adapted to pivotally connect said frame member with the chassis of an automobile at a point between its front and rear wheels, a traction means disposed between the arms of said frame and adapted to engage the ground, a driving gear at each end of said traction means, a pair of freely rotatable and independently movable tire supporting endless treadways upon said frame, gears adapted to be driven by each of said treadways and engage the gears at the ends of said traction means, an auxiliary power take-off device adapted to be driven by each of said treadways, and clutch means for rendering the gear connection between one or the other of said treadways and said traction means inoperative to permit the use of one of said power take-off devices at a high speed through the medium of the automobile differential while the other treadway is held stationary by said traction means and its driving gear.

ERNEST E. ERVIN.